United States Patent [19]

Pecoraro

[11] Patent Number: 5,160,601
[45] Date of Patent: Nov. 3, 1992

[54] HYDROCARBON CONVERSION WITH OCTANE-ENHANCING CATALYSTS

[75] Inventor: Theresa A. Pecoraro, San Ramon, Calif.

[73] Assignee: Chevron Research Company, San Francisco, Calif.

[21] Appl. No.: 577,399

[22] Filed: Sep. 4, 1990

Related U.S. Application Data

[60] Division of Ser. No. 511,822, Apr. 16, 1990, Pat. No. 5,001,097, which is a continuation of Ser. No. 252,236, Sep. 30, 1988, abandoned.

[51] Int. Cl.$^5$ ............................................. C10G 11/02
[52] U.S. Cl. ..................................... 208/120; 208/113; 208/118; 208/121; 208/122
[58] Field of Search ................................. 208/120, 127

[56] References Cited

U.S. PATENT DOCUMENTS

| | | | |
|---|---|---|---|
| 2,548,860 | 4/1951 | Bond, Jr. | 196/52 |
| 2,565,883 | 8/1951 | Ryland | 252/453 |
| 2,782,144 | 2/1957 | Pardee | 196/52 |
| 3,140,249 | 7/1964 | Plank et al. | 208/120 |
| 3,271,418 | 9/1966 | Plank et al. | 208/120 |
| 3,352,796 | 11/1967 | Kimberlin, Jr. | 252/455 |
| 3,449,265 | 6/1969 | Gladrow et al. | 252/455 |
| 3,553,104 | 1/1971 | Stover et al. | 208/120 |
| 3,558,476 | 1/1971 | Robbins, Jr. et al. | 252/455 |
| 3,830,725 | 8/1974 | Dolbear et al. | 208/120 |
| 3,867,308 | 2/1975 | Elliott, Jr. | 252/455 Z |
| 3,867,310 | 2/1975 | Elliott, Jr. | 252/455 Z |
| 3,929,621 | 12/1975 | Lussier et al. | 208/120 |
| 3,994,800 | 11/1976 | Lussier et al. | 208/120 |
| 4,198,319 | 4/1980 | Alafandi et al. | 252/455 Z |
| 4,226,743 | 10/1980 | Seese et al. | 252/455 Z |
| 4,259,212 | 3/1981 | Gladrow et al. | 208/120 |
| 4,266,672 | 5/1981 | Van Nordstrand | 208/120 |
| 4,310,441 | 1/1982 | Alafandi et al. | 252/455 Z |
| 4,357,265 | 11/1982 | Chiang | 252/455 Z |
| 4,451,355 | 5/1989 | Mitchell et al. | 208/113 |
| 4,465,588 | 8/1984 | Occelli et al. | 208/120 |
| 4,480,047 | 10/1984 | Beck et al. | 502/65 |
| 4,499,197 | 2/1985 | Seese et al. | 502/65 |
| 4,617,108 | 5/1985 | De Jong | 208/74 |
| 4,707,461 | 11/1987 | Mitchell et al. | 502/64 |

OTHER PUBLICATIONS

Differences between Silica & Silica-Alumina Gels, Plank et al., Socony-Vacuum Labs., Aug. 9, 1940.
Prediction of Cracking Cat. Behavior by a Zeolite Unit Cell Size Model, Pine et al, Exxon Res., Apr. 25, 1983.
Diff. between Si & Si-Alumina Gels, Plank, Socony-Vacuum Labs Co. Inc., Apr. 9, 1946.

*Primary Examiner*—Helane Myers
*Attorney, Agent, or Firm*—J. A. Hagenah

[57] ABSTRACT

Novel hydrocarbon conversion catalysts and methods for their preparation are disclosed. The catalysts are particularly appropriate for the conversion of hydrocarbon feeds to high octane gasoline, while increasing light cycle oil and decreasing heavy cycle oil yield. The catalyst comprises a zeolite, a cogelled silica-alumina matrix, and clay.

4 Claims, 3 Drawing Sheets

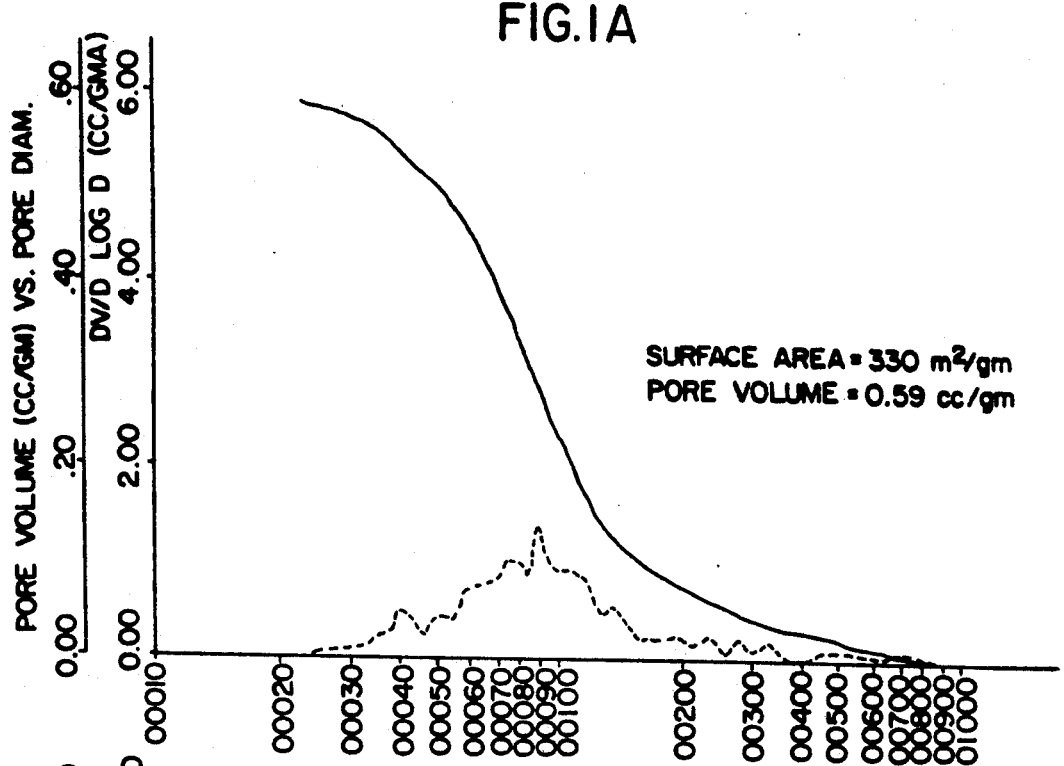
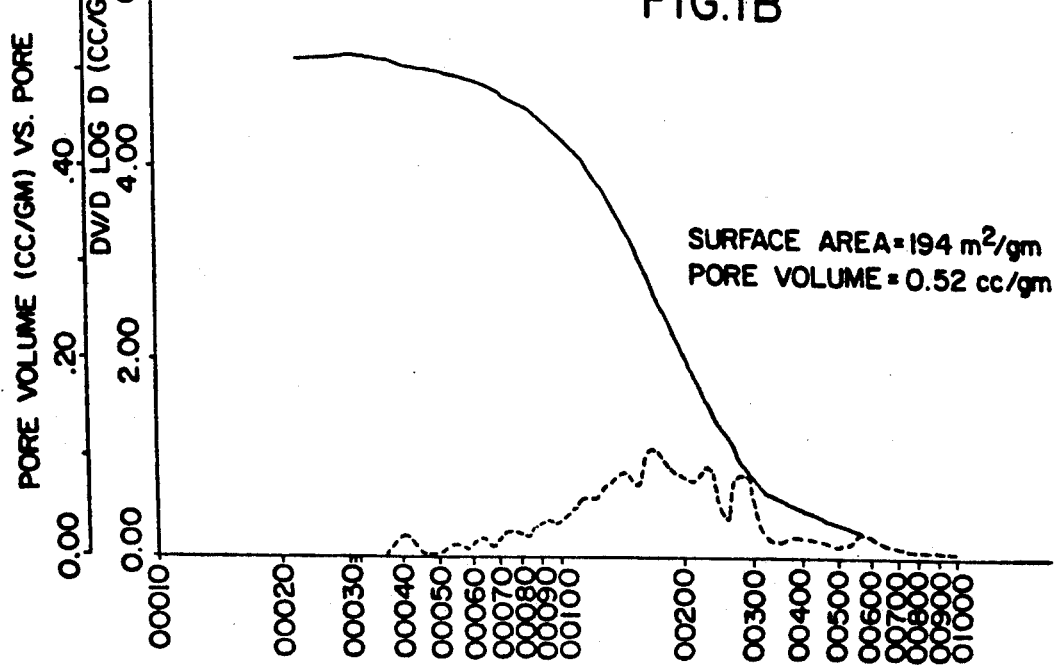

HYDROCARBON CONVERSION WITH OCTANE-ENHANCING CATALYSTS

This is a division of application Ser. No. 511,822, filed Apr. 16, 1990, now U.S. Pat. No. 5,001,097, which is a continuation of U.S. Ser. No. 252,236 filed Sep. 30, 1988, now abandoned.

FIELD OF THE INVENTION

This invention relates to novel hydrocarbon conversion catalysts, methods for their preparation, and use thereof in hydrocarbon conversion processes. More particularly, the present invention relates to a catalytic cracking catalyst suitable for the conversion of hydrocarbon feeds to high octane gasoline, while increasing light cycle oil yields, and decreasing heavy cycle oil yields

BACKGROUND OF THE INVENTION

The refining industry today emphasizes not only the gasoline yield of a hydroconversion process, but also the gasoline quality obtainable by that process, particularly its octane Gasoline octane is a performance feature of the gasoline which helps prevent engine knocking, and is directly related to the types of hydrocarbon molecules and additives present. As the energy industry implements the federally-mandated elimination of antiknock additives containing lead, it has searched for alternate ways to meet its preferred octane requirements. Since the industry blends gasoline components from several sources in the refinery, such as the reformer, the alkylation plant, the FCC unit, etc., it must optimize the octane contribution from each of these units It does this by optimizing the production of those components which are high octane. In the United States, the fluid catalytic cracking (FCC) process provides about 35% of the gasoline pool; consequently, refiners are very interested in boosting the octane of the product coming from these type units. Several factors affect the gasoline yield and quality produced by an FCC unit. Feedstock type, catalyst type, and process variables, in particular, temperature and pressure, are among the major factors affecting octane of the gasoline. While refiners can ordinarily optimize the process parameters at which a particular unit operates, they usually have limited flexibility in choosing the feed type. Therefore, changing the catalyst offers refiners a simple and cost-effective way to increase further the gasoline octane of FCC products.

Prior to the advent of zeolites, cracking catalysts consisted primarily of clays, either natural, synthetic, or pretreated, and/or amorphous mixed metal oxides, primarily silica-alumina. When zeolites were introduced, by and large replacing the amorphous catalysts, several beneficial results were readily recognized. For example, zeolite-containing catalysts showed a superior selectivity to gasoline over silica-alumina catalysts. However, this incremental gasoline make tended to come at the expense of $C_4$ gases, dry gas, and coke. The zeolite-containing catalysts typically reduced the coke yield by about 20%, the $H_2$, $C_1$, and $C_2$ production by 40%, and the $C_3$ and $C_4$ olefins. These catalysts also increased the $C_5+$gasoline yield, the light cycle oil yield, and the heavy cycle oil yield, while also increasing its density.

Unfortunately, gasolines produced by zeolite-containing catalysts also generally contain more paraffins and aromatics and less olefins than those produced by silica-alumina catalysts, thereby reducing the octane, since reducing olefinicity generally reduces octane. The trend in the refining business continued toward maximizing the gasoline yield at the expense of octane. Toward this end, catalyst manufacturers began developing catalysts containing Y zeolites, primarily hydrogen and rare earth-exchanged Y zeolites, and also replaced active amorphous silica-alumina matrices with less active clay matrices usually bound by a sol comprising silica, alumina, or mixture thereof. This further reduced the olefinicity of the gasoline by reducing and/or eliminating the matrix contribution to the cracking but did further optimize yield.

In general, then, prior art zeolite catalysts show a tremendous activity advantage, and good gasoline selectivity. Unfortunately, they continue to demonstrate higher hydrogen-transfer activity which reduces the olefinic character of this gasoline, thereby reducing the octane rating. Current zeolitic catalysts also minimize the matrix contribution to both the activity and the selectivity. A challenge, therefore, remained: How to modify the catalyst, particularly the zeolite and the matrix chemistry, to achieve both good conversion and good selectivity to gasoline with a high octane rating for vacuum gas oil (VGO). Particularly desirable would be a catalyst which performs well on VGO which contains very few contaminants and for VGO's plus residua and residua blends which contain contaminating metals, especially vanadium. The present invention seeks to provide the answer.

DESCRIPTION OF THE PRIOR ART

Numerous cracking catalyst formulations and processes for their preparation are described in the patent literature. A good general tabulation of zeolite-containing examples can be found in U.S. Pat. No. 4,480,047, Beck, et al., at Cols. 2-6. Beck, et al. also review the problems associated with processing vacuum gas oil, residuum and reduced crudes. They describe a catalyst nominally containing zeolite, preferably HY zeolite and/or ultra-stable HY zeolite, clay, alumina and an acidic silica-alumina cogel matrix. The zeolite is preferably partially exchanged with high La/Ce ratio solution in a wetting step, and rare earths are precipitated onto the matrix. The catalyst has high metals tolerance and is capable of cracking heavy reduced crude oils, producing higher LCO/slurry oil ratio.

Hydrocarbon conversion catalysts comprising a zeolite dispersed in a siliceous matrix are known in the art, see for example, U.S. Pat. No. 3,140,249 and U.S. Pat. No. 3,352,796. Cracking catalysts containing a zeolite, silica-alumina, and a clay are also known, for example, U.S. Pat. No. 3,449,265. Hydrocarbon conversion catalysts comprising a physical mixture of silica-alumina and a crystalline alumino-silicate zeolite in a siliceous matrix are also known, U.S. Pat. No. 3,558,476. Processes for preparing hydrocarbon conversion catalysts containing a zeolite, clay, silica, or silica-alumina are disclosed in U.S. Pat. Nos. 3,867,308 and 3,867,310, and a process for preparing a hydrocarbon conversion catalyst containing a silica-alumina hydrogel, a clay and/or crystalline alumino-silicate zeolite is disclosed in U.S. Pat. No. 4,226,743. A process for preparing a hydrocarbon conversion catalyst containing catalytically active silica-alumina and/or silica-alumina rare earth oxide cogels, a clay and/or alumina, and crystalline aluminosilicate zeolites is disclosed in U.S. Pat. No. 4,499,197. Unfortunately, catalysts which display the greatest conversion do not produce gasoline with the highest octane and do not maximize a light cycle oil yield of improved quality at the expense of heavy cycle oil.

For example, U.S. Pat. No. 3,830,725, Dolbear et al, describes ultra-stable Y zeolite promoters, Z-14US, for hydrocarbon cracking which are exchanged with a combination of nickel and magnesium ions. These promoters have increased the selectivity for aromatic gasolines having increased the nonleaded octane ratings. The Ni and Mg-exchanged Z-14 USY zeolites may also be advantageously combined with rare earth-exchanged faujasite-containing catalysts. U.S. Pat. No. 3,929,621, Albers et al, describes a process for cracking hydrocarbons to obtain substantial yields of gasoline fractions of high aromatic and olefin content, wherein a copper-exchanged zeolite cracking catalyst capable of producing high octane gasoline is used. The exchanged zeolite is combined with a major portion of inorganic oxide matrix. U.S. Pat. No. 3,994,800, Albers et al, teaches a process for cracking hydrocarbon feedstocks with a composite catalyst comprising an improved hydrogen-exchanged Y-type zeolite component and an amorphous inorganic matrix component. The use of this catalyst yields cracked naphthas of increased olefinic content for the production of lead-free high octane gasoline. Incorporating a portion of calcined rare earth-exchanged Y-type zeolite into the composite allegedly further improves the levels of $C_3$ and $C_4$ olefins. U.S. Pat. No. 4,357,265 describes the preparation of an exchanged zeolite cracking catalyst which produces high octane gasoline with good selectivity. The catalyst is prepared by exchanging sodium zeolite Y with ammonium, calcining, mixing with oxide matrix, and exchanging with aluminum. These catalysts have allegedly higher activity than hydrogen-exchanged zeolites and better selectivity than rare earth-exchanged zeolites. U.S. Pat. No. 4,259,212, Gladrow et al, describes a cracking catalyst comprising discrete particles of ultra-stable Y-type zeolite and discrete particles of alumina. These particles are disperse in a porous oxide matrix to produce a catalyst containing 5 to 40 wt % ultra-stable Y-type zeolite, 5 to 40 wt % alumina, and 40 to 90 wt % of porous oxide matrix This cracking catalyst shows high activity and selectivity for the production of high octane gasoline fractions from higher boiling feedstocks.

The key ingredient in any FCC catalyst remains the zeolite. Typical commercial FCC catalysts generally include a crystalline alumino-silicate zeolite as the major cracking component, and the typical zeolites include hydrogen and/or rare earth metal-exchanged synthetic faujasites of the X or Y type. For octane enhancement, the performance of the Y-type zeolite is, in general, a function of its $SiO_2/Al_2O_3$ ratio.

It is ordinarily the ultra-stable form of the Y zeolite (USY) having an $SiO_2/Al_2O_3$ ratio greater than 6 which tends to produce octane and coke-selective FCC catalyst components. The preferred USY is a hydrogen-exchanged and reduced SiO ratio form of the Y-type zeolite. See L. A. Pines, P. J. Maher, and W. A. Wachter, *Journal of Catalysis*, 85, pp. 466-476, 1984, where the performance of USY was correlated with its $SiO_2/Al_2O_3$ ratio, it was shown that gasoline octane and coke selectivity generally increase as the $SiO_2/Al_2O_3$ ratio increases. Also, extensive ion-exchange and high temperature treatment, with or without the presence of added steam, produces an especially active and stable zeolite.

In general, the catalyst composition of an FCC hydrocarbon conversion catalyst also includes a matrix with the alumino-silicate zeolite. The matrix of an FCC catalyst serves several purposes, contributing to both the chemical and the physical characteristics of the catalyst. Chemically, it can improve the activity, alter the selectivity, improve the hydrothermal stability, increase the metals (Ni, V, Na, Fe, Cu) and nitrogen tolerance, and control the attrition and heat transfer characteristics. It also affects the density, particle size distribution, surface area, pore volume, and pore size distribution of spray-dried FCC catalyst.

The matrix of an FCC catalyst may ordinarily be comprised of inorganic oxide gels, hydrogels, sols, and-/or combinations thereof, clays, synthetic or natural, inorganic oxides, and all combinations of all of the above. Silica-alumina composites, in particular, comprise a major component of many FCC catalyst matrices.

The prior art teaches a number of ways to prepare these composites to affect the chemical and physical properties of the final catalyst composition. U.S. Pat. No. 4,499,197 to Sense et al, for example, describes the preparation of inorganic oxide hydrogels, and more particularly, catalytically active amorphous silica-alumina and silica-alumina rare earth cogels. The active cogels are prepared by reacting aluminate and silicate solutions to obtain a silica-alumina pregel, and then reacting the pregel with an acidic rare earth and of aluminum salt solution under complete mixing conditions. C. J. Plank, *Journal of Colloid Science*, 2,413 (1947), describes the effect of pH, time, and exchange medium on the porous structure of a silica-alumina gel.

U.S. Pat. No. 4,226,743 describes a process for preparing a silica-alumina catalyst which is dense and attrition resistant. The silica-alumina hydrogel is precipitated at high pH and subsequently reacted with sufficient acid aluminum salt at a pH below 4 to obtain an acidic hydrogel slurry Substantial quantities of clay and/or crystalline alumino-silicate zeolites may be included. U.S. Pat. No. 4,310,441 describes large pore silica-alumina gels and a method for producing them. The silica-alumina gel is derived from a cationic aluminum source and also an anionic aluminum source.

Natural and synthetic clays can also contribute positively to the chemical and physical characteristics of the matrix, and thus to the final nature of an FCC catalyst. While natural clays can be used as hydrocarbon conversion catalysts themselves, they generally require chemical activation with acid in order to increase both their surface area and their number of acid sites. They can also be the major component of the matrix or serve as "extenders" of more expensive, synthetically-prepared silica-alumina, etc. matrices.

The types of clays which can be used are quite numerous. See Grimm, R. E., "Clay Mineralogy", McGraw-Hill, New York, N.Y., 1968. There are several classifications of crystalline clay minerals:

a. two-layer types, for example, kaolinite group and halloysite group;

b. three-layer types, such as the montmorillonite group and the illite group;

c. regular mixed-layer types, for example the chlorite group; and d. chain-structure type, such as attapulgite, sepiolite, and palygorskite.

Since their colloid chemistry is quite complex, the physical and the chemical properties of these clays in the final FCC catalyst are very dependent on their pretreatment and method of incorporation into the catalyst itself. U.S. Pat. No. 4,266,672, for example, describes the incorporation of sepiolite, a chain-structure type clay, into an FCC catalyst to alter its pore size distribution and attrition.

SUMMARY OF THE INVENTION

This invention comprises catalysts capable of hydrocarbon conversion with octane enhancement. Specifically, it comprises catalysts comprised of a large-pore zeolite tailored to enhance octane while maintaining high gasoline yield and conversion, a high surface area matrix tailored to contribute to both the activity and octane-enhancing characteristics of the catalyst, and a natural or synthetic clay incorporated in a specific manner to tailor the pore structure, to serve as a weighting agent, and/or in some instances, alter the selectivity of the catalyst. In addition to the clay, a porous inorganic oxide may be optionally be added to improve and/or alter the activity and the physical properties of the catalyst. Among other factors, the catalyst not only converts hydrocarbon feeds to high octane gasoline, but increases the light cycle oil yield and decreases the heavy cycle oil yield also while improving the quality of both.

The catalyst of this invention comprises a composition for increasing the octane and yield of gasoline produced from a fluid catalytic cracking process, comprising:
a. large pore zeolite;
b. natural or synthetic clay; and,
c. an amorphous silica-alumina matrix, said matrix prepared by steps comprising preparing a mixture comprising a silica sol and an aluminum salt while maintaining the pH of said mixture below about 4, and precipitating a cogel from said mixture by adjusting the pH; wherein said composition is prepared by steps comprising:
  (i) combining said zeolite, clay, and cogel, provided that the pH of said cogel or said combination containing said cogel is adjusted to between about 4 and 7, conditions are controlled to induce syneresis and viscosity reduction, and further provided that when said zeolite is introduced into said combination the pH is between about 3 and 7; and
  (ii) forming said combination into particles.

The catalyst also performs well in combination with known "octane-enhancing" additives, such as H-ZSM-5, to yield an increased octane rating of the gasoline fraction.

BRIEF DESCRIPTION OF THE DRAWINGS

FIG. 1A illustrates that a typical catalyst has substantial pore volume in both the micropore diameter range, ≦60 Å, and in the mesopore diameter range, 70–1000 Å.

FIG. 1B illustrates that after steaming, there is a substantial increase in the pore volume in the mesopore diameter range.

DETAILED DESCRIPTION OF THE INVENTION

The Catalyst Composition

Figure 2:
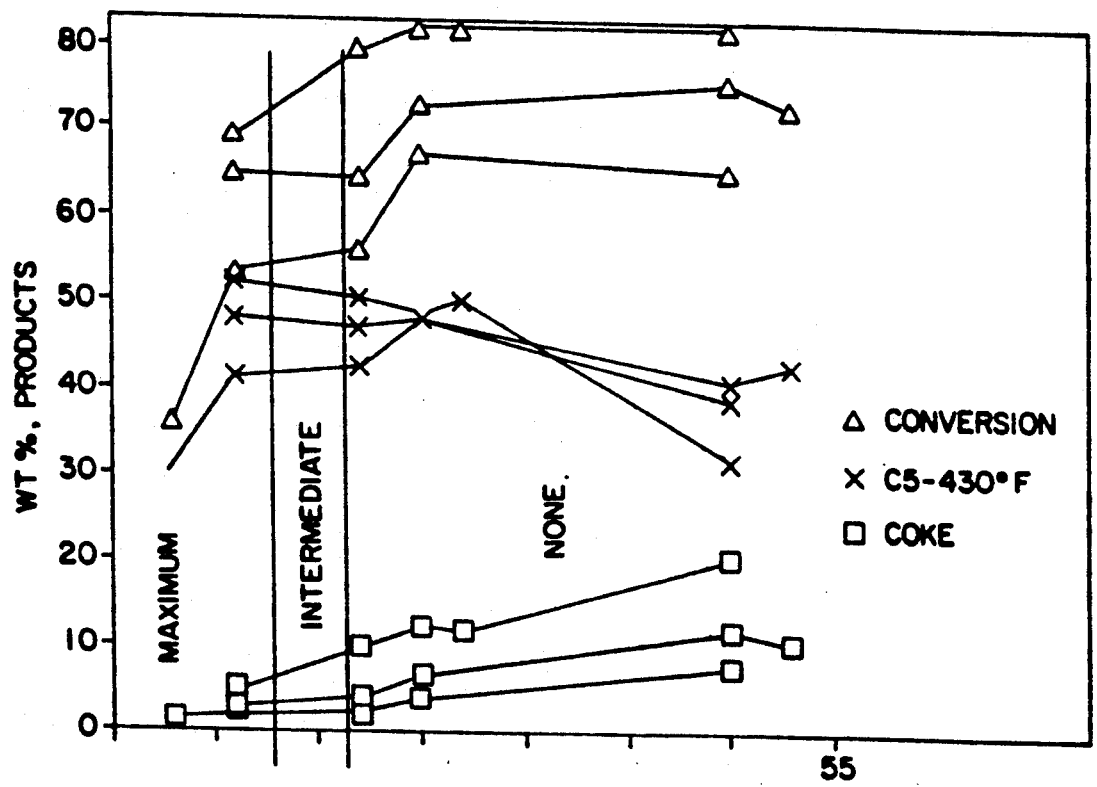
FIG. 2 shows a typical pore size distribution after steaming.
Figure 3A:
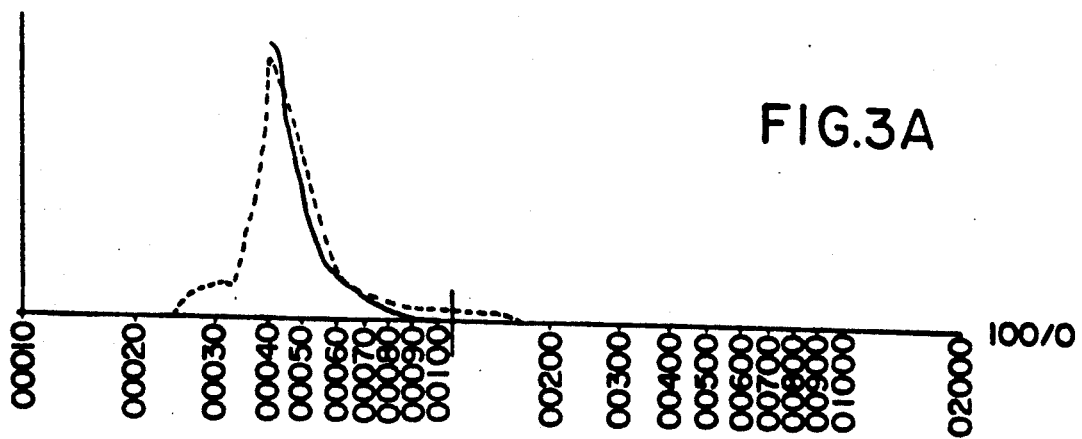
FIG. 3A–D illustrate the Effect of Georgia Kaolin on the surface area and pore size distribution of a preferred embodiment of the spray-dried matrix; the matrix in FIG. 3A contains 100 wt. % cogel, the matrix in FIG. 3B contains 80 wt. % cogel and 20 wt. % kaolin, the matrix in FIG. 3C contains 50 wt. % Kaolin, and the matrix in FIG. 3D contains 40 wt. % cogel and 60 wt. 5 Kaolin.
Figure 3B:
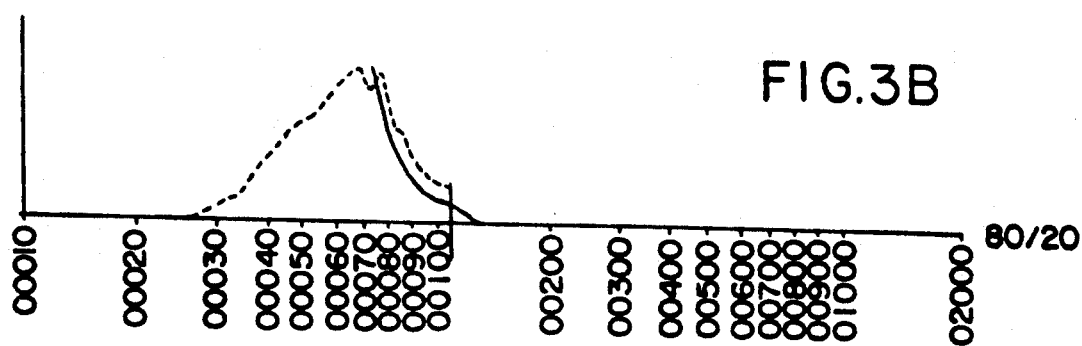
Figure 3C:
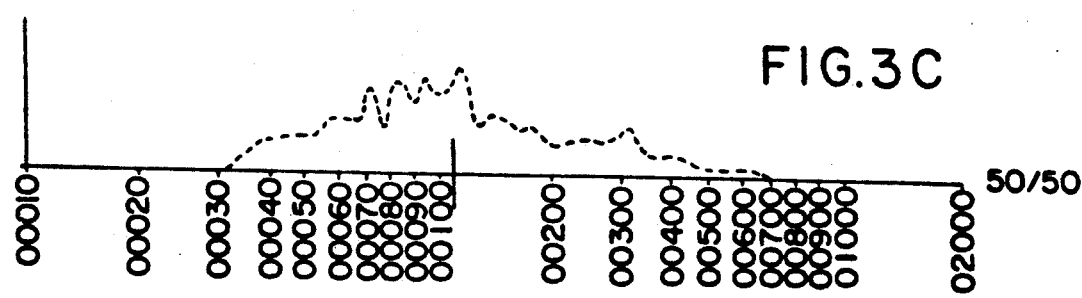
Figure 3D:
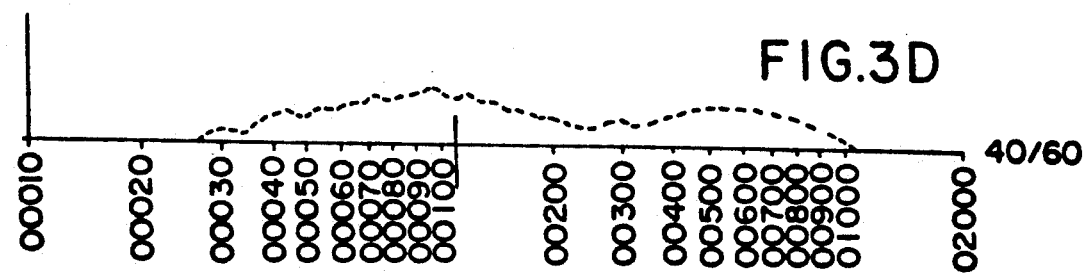

The catalyst of the present invention consists primarily and preferentially of three components: large pore, preferably Y-type zeolite, clay, and silica-alumina cogel. Table 1 shows the typical physical and chemical properties of a preferred embodiment of the catalyst.

In general, in order to employ a cracking catalyst which shows high levels of activity in a commercial FCC operation, it is preferred to employ a catalyst which, in the course of extended operation, maintains a level of conversion of at least 40% by weight and more preferably of at least 50% by weight. In this context, the weight percent conversion represents 100 minus the weight percent of fresh feed boiling above the temperature of 221° C. (430° F). The weight percent conversion includes the weight percent coke and the weight percent fresh feed boiling below the temperature of 221° C. (430° F). The conversion capabilities may be expressed in terms of the conversion produced during actual operation of the FCC process or in terms of the conversion produced in standard catalyst activity tests.

The preferred catalyst may be further defined as one which, in its equilibrium state, exhibits a specified activity expressed as a weight percentage derived from the micro-activity test (MAT). It may also be described as one which exhibits a specified selectivity expressed as the ratio of $C_4$ olefins to the total $C_4$ product as derived by the MAT. The preferred MAT activity of the present catalyst is measured by a modified ASTM D-3907. The ASTM D-3907 procedure provides relative MAT activity for conversion of a standard feed at standard conditions. We have modified the procedure by changing conditions and feedstocks as shown in the Tables. The ratio of the $C_4$ olefin to the total $C_4$ product correlates well with the octane values of the light gasoline, i.e., the higher the $C_4$ olefin to $C_4$ total ratio, the higher the octane of the light gasoline. This ratio also suggests that the octane of the heavy gasoline will also be improved. For the purposes of this invention, light gasoline is defined as the $C_5$ fraction up to material boiling at approximately 265° C. and heavy gasoline as the material boiling from approximately 265° C. to 430° C.

The foregoing weight percentage and ratio of $C_4$ olefins to the total $C_4$ product are the values obtained on a standard feed at 496° C. (925° F.), 15 to 16 (weight hourly space velocity), 3 C/O (catalyst to oil weight ratio), and calculated on the basis of a pre-equilibrated (as described above) catalyst dried at 593° C. (1100° F.) in air.

The preferred catalyst can also be categorized as one which, in the course of extended operation, maintains a level of conversion of at least 40% by weight or volume and, more preferably, of at least 50% by weight or volume on particularly on a feedstock such as Feedstock A in the Examples. Also see Table 2.

As discussed above, the preferred catalyst composition comprises the primary components: zeolite, a cogel matrix, and clay. Each of these components is more specifically defined as follows.

The Zeolitic Component

The zeolitic component of this invention comprises a large pore, crystalline alumino-silicate zeolite, the preferred example of which is a "stabilized" hydrogen Y-type faujasite or "ultra-stable" Y-type faujasite. These zeolites are well known, and Y zeolite itself is disclosed in U.S. Pat. No. 3,130,007, Breck. U.S. Pat. Nos. 3,293,192 and 3,402,996 also describe "stabilized" or "ultra-stable" Y-type zeolites. All are incorporated herein by reference. "Zeolite Chemistry and Catalysis", Jule A. Rabo, ACS Monograph 171, (1976), Chapters 3 and 4, provides a useful reference describing the preparation and characteristics of the various Y-type zeolites.

For the purpose of this invention, "ultra-stable Y zeolite" refers to a Y zeolite which is highly resistant to degradation of crystallinity by high temperatures and steam treatment. A particular key to producing the "ultra-stable" form is to calcine a low sodium ammonium or hydrogen Y zeolite in an $NH_3$ or $H_2O$ atmosphere.

A more preferred Y zeolite is characterized by an $R_2O$ content (where R is Na, K or any other alkali metal ion) of less than 4% by weight, preferably less than 1% by weight, a unit cell size less than about 24.60 Angstrom units (Å), and a $SiO_2/Al_2O_3$ mole ratio in the range of 3.5 to 7 or higher. The "ultra-stable" form of the Y zeolite is ordinarily obtained using a series of alkali metal reduction steps followed by calcination at high temperature in the presence of ammonia or water.

In a preferred example, NaY, such as Union Carbide zeolite LZ-Y52, which has an $Na_2O$ content of 13.0% by weight, a cell constant of 24.68 Å, and an $SiO_2$ to $Al_2O_3$ ratio of 4.8, is base-exchanged with an aqueous solution of an ammonium salt, such as ammonium nitrate until the alkali metal content is reduced to about 4% or less by weight $Na_2O$. The result is an ammonium Y, Union Carbide zeolite LZ-Y62, which has an $Na_2O$ content of 2.4% by weight, a cell constant of 24.73 Å, and an $SiO_2$ to ratio of 5.2. It is then calcined at a temperature of 538° C. (1000° F.) to 816° C. (1500° F.) over a period of 0.5 to 5 hours. Steam may be added to the system during calcination. This results in a high sodium form of an "ultra-stable" hydrogen Y zeolite which has a unit cell size of about 24.5 Å.

Another example of an appropriate zeolite is Union Carbide zeolite LZ-Y72 which has an $Na_2O$ content of 2.7% by weight, 5.2. Preferably, the "ultra-stable" hydrogen Y zeolite is again successively base-exchanged with an aqueous solution of ammonium salt until the $Na_2O$ content is reduced to less than 1% by weight. As an example, successive base-exchanged LZ-Y72 yields Union Carbide zeolite LZ-Y82 having an $Na_2O$ content of 0.20% by weight, a cell constant of 24.51 Å, and an $SiO_2$ to $Al_2O_3$ ratio of 6.4.

More preferably, the low sodium "ultra-stable" hydrogen Y zeolite is calcined again in the presence of steam at a temperature of about 538° C. (1000° F.) to about 816° C. (1500° F.) for 0.5 to 5 hours, to produce a "superstable" hydrogen Y zeolite having a cell constant of less than 24.40 Å. An example is Union Carbide LZ-Y20 which has a $Na_2O$ content of 0.20% by weight, and a cell constant equal to 24.36 Å.

This sequence of ion exchange and treatment in a hydrothermal environment results in the substantial reduction of the alkali metal content of the original zeolite and a substantial reduction in the unit cell size. This combination is believed to lead to the ultrahigh stability of the resultant Y zeolite.

The alkali metal content of crystalline alumino-silicates should preferably be low in order to increase the thermal and hydrothermal stability of the cracking catalyst. The alkali metal content of the zeolite is ordinarily reduced by using a base-exchange procedure. The exchange occurs by repeatedly or continuously contacting the zeolite with aqueous solutions of salts or other compounds to effect the exchange of the alkali metal by the cations in the aqueous solution. These cations can be polyvalent metal cations or hydrogen and/or hydrogen precursors, such as ammonium.

In a preferred embodiment, the zeolitic component of this invention is exchanged with rare earth ions such as lanthanum, cerium, praseodymium, neodymium, promethium, samarium, europium, gadolinium, terbium, dysprosium, holmium, erbium, yttrium, thulium, scandium, lutetium, or mixtures thereof. In a more preferred embodiment, the rare earth ion will be primarily lanthanum. The presence of rare earth metal ion improves both the thermal and hydrothermal stability of the Y zeolite.

U.S. Pat. No. 3,537,816 describes a process for further reducing the alkali metal content of a crystalline zeolitic alumino-silicate of the faujasite type which has had its alkali metal content previously reduced by at least one base exchange with an aqueous solution containing at least rare earth metal ions which replace part of the alkali metal ions. This is ordinarily done by suspending the zeolite in water together with a water-insoluble organic cation-exchange resin in the form selected from the hydrogen and the ammonium forms so as to replace $H^+$ or $NH_4^{++}$ for the alkali metal ions.

In preferred embodiments, a super-stable Y, preferably Union Carbide LZ-Y20 or Union Carbide LZ-Y82, comprises the zeolite in the composited catalyst. It is chosen primarily for its coke selectivity and reduced hydrogen transfer activity. FIG. 2 illustrates the kind of MAT activity and selectivity that a reduced cell constant zeolite, i.e. a cell constant less than 24.35 Å provides. It also shows MAT data for physical mixtures of the zeolites and an inactive diluent. These reduced cell constants are obtained after steaming in the laboratory or during the actual FCC operation in the refinery.

In a still more preferred embodiment of the present invention, ultra-stable Y zeolite which has also been rare earth-exchanged is utilized. Table 2 summarizes MAT data for a physical mixture of 20 weight percent zeolite and an inactive diluent. The rare earth-exchanged zeolite in this example, LZ-Y20, clearly shows an improved hydrothermal stability, which is reflected in a higher conversion at constant operating conditions than its non-exchanged counterpart.

The Co-Gel Matrix

Silica, alumina and their amorphous mixtures are well known as matrices or supports for catalysts used in hydrocarbon conversion processes. The method of preparation controls physical properties, such as pore structure and volume, surface area, density and catalyst strength, which in turn governs the resultant activity such as cracking or isomerization. It must be noted that seemingly very minor differences in the preparation factors discussed below can make significant differences in the make-up and effectiveness for a particular purpose of the matrix and a catalyst of which it may be a component.

The numerous specific factors that are involved in preparing matrix materials containing silica-alumina mixtures include:
1. the mole ratio of silica to alumina;
2. the molar concentrations of the silica and alumina in water;
3. the type and/or source of silica;
4. the type and/or source of alumina;
5. the order of addition of silica and alumina;
6. the pH of the solutions when combined;
7. the pH of the mixture during precipitation;
8. the pH of the mixture after precipitation;
9. the precipitating agent;
10. temperatures throughout the process;
11. mixing rates;
12. presence or absence of aging;
13. presence or absence of syneresis;
14. peptization agent;
15. washing and washing agents;
16. method of drying.

The final matrix is highly sensitive to each of these factors, and variations among these factors, especially in combination, will greatly influence the particular properties of the final matrix produced.

The patent literature contains numerous descriptions that teach and claim specific methods of matrix and catalyst preparation for FCC catalyst. Some recent patents for preparing matrices and FCC catalysts therefrom include:

U.S. Pat. No. 4,617,108, Shyr, which purports to teach a process where catalyst is prepared by a method comprising preparing hydrogel by mixing an aluminum, ammonium and salt of a strong (pKa <2) acid, and alkali metal silicate such that the concentration of ammonium is enough to form a hydrogel, separating the hydrogel from solution and calcining it to form acidic silica-alumina. Shyr teaches the combination of this matrix with clay and zeolite for use in an FCC unit.

U.S. Pat. No. 4,198,319, Alafandi, discloses a process where catalyst is prepared by a method comprising mixing in a slurry a faujasite or silica-alumina gel containing 50-70 mole silica, and clay, and spray-drying slurry into a catalyst. Alafandi also shows combinations of gel with clay and zeolite for use in an FCC unit.

U.S. Pat. No. 4,289,653, Jaffe teaches preparing an extruded catalyst by mixing aluminum sulfate and sulfuric acid with sodium silicate to form a silica sol in an alumina salt solution at pH of 1-3, adding NH$_4$OH under substantially constant pH of at least 4 to 6; adding more NH$_4$OH to form a cogelled mass to pH 7.5-8.5; washing cogelled mass; mulling the mass with peptizing agent, a Group VI-B metal compound and a Group VIII metal compound to form extrudable dough; extruding; and drying and calcining.

Detailed Description of the Present Cogel

I have now discovered a process for preparing an amorphous silica-alumina cogel which can be formed into spheres via spray drying, and then subsequently dried to a water content of less than 5 wt. percent or incorporated into a multicomponent catalyst. This cogel is surprisingly active for the cracking of large molecules, such as in vacuum gas oils, to smaller molecules, such as gasoline, and find particular use as the active matrix of the catalyst of the present invention. The olefinicity of the products, as indicated by the C$_4$ olefin to C$_4$ total ratio, is surprisingly high. This is indicative of gasoline of high octane.

The process for preparing the amorphous silica-alumina cogel yields a material which is surprisingly attrition-resistant in spray-dried spheres, and surprisingly versatile with respect to the pore volumes, pore size distributions and densities, apparent bulk densities, attainable. Among the unique characteristics of the cogel are:

high MAT conversions obtainable between 65% and 80%;
high surface areas, ranging from about 150 to 450 m$^2$/gm;
N$_2$ pore volumes ranging from about 0.2 cc/gm to 1.2 cc/gm;
N$_2$ pore size distribution peak diameter ranging from about 30 Å to 260 Å, most pores occurring in the meso pore range of 20 to 500 Å. (Micropores are defined as <20 Å. Macropores are defined as >500 Å.) This allows access into the catalyst of larger hydrocarbon molecules, rendering the present catalyst particularly suitable for residua applications;
$\gamma$-Al$_2$O$_3$ content of the cogels of less than 20 wt.%, usually <5%, after calcining;
high attrition resistance.

In a preferred embodiment, the cogel is prepared by the steps comprising:
1. adding a silicate solution to an aqueous solution of an acid aluminum salt, such as aluminum chloride or aluminum sulfate and an acid, such as hydrochloric or sulfuric, but preferably a weak acid such as acetic, to form an acidified silica sol in said aluminum salt solution; the pH of said mixture being in the range of 1 to less than about 4;
2. raising the pH of the mixture by adding base, such as NaOH or NH$_4$OH, preferably NH$_4$OH, to a pH range of about 5-9;
3. aging the cogelled silica alumina hydrogel by time and/or temperature combinations;
4. removing the filtrate to obtain a cogelled hydrogel;
5. adding an acid, such as nitric, sulfuric, or hydrochloric, but preferably a weak acid such as acetic acid, to adjust the pH to 4-7 to induce controlled syneresis. Various combinations of time, temperature, pH and Na$^+$ concentration can also be used to induce the desired syneresis;
6. spray-drying the cogel to form spherical particles;
7. washing either the cogelled hydrogel or the spray-dried particles to reduce the Na$_2$O content to less than 1 weight percent.

The cogels can be made in either a batch or a continuous mode.

Several definitions and explanations are required to clarify further the steps comprising the preparation of the cogel. First, the silica sol described in Step 1 is preferably defined as a colloidal dispersion or suspension of the metal oxide in a liquid. In step 3, "hydrogel" may be described as a coagulated colloid with an imbibed liquid phase.

In step 5, "syneresis" refers to molecular rearrangements which occur in hydrogels, in particular, silica and silica-alumina hydrogels. These rearrangements consist of condensation reactions among the units present in the hydrogels. Any factors which promote or disrupt these reaction affect the structure of the hydrogel and the structure of the final dried gel.

A process parameter critical to the successful creation of the desired catalyst is the syneresis of the cogel. Syneresis may be best defined or analogized to an aging process in which a composition, particularly a gel, contracts and gives up a liquid, usually water, in the process. This syneresis in the present invention materially alters the nature of the cogel and therefore the catalyst, rendering it uniquely suitable for the purposes discussed above. For a discussion of syneresis in silica-alumina gels, see C. J. Plank, et al., J. Colloid. Sci., 2 (1947) 399, and C. J. Plank, J. Colloid. Sci., 2 (1947) 413, incorporated herein by reference.

Several factors affect syneresis. Among these are the composition of the gel, the solids concentration of the gel, the pH, time, temperature, [Na+] and the base exchange medium. Consequently, step 5 helps to control the physical and chemical characteristics of the spray-dried product, e.g. pore volume and pore size distribution. Aging at temperatures of about 25–105° C., preferably 60–90° C., in step 3 affects the rate of filtration in step 4 and the physical characteristics of the spray-dried product of step 6. In a less preferred embodiment, step 5 may be eliminated. Step 7, washing the cogelled mass or the spray-dried particles, may be accomplished at ambient or elevated temperatures, i.e. <100° C., with base exchange medium such as ammonium acetate, or Al+++ containing solution to reduce the Na+ concentration to less that about 0.5 weight percent. Ammonium acetate at elevated washing temperatures is particularly effective. Step 7 may be done at various points in the procedure after step 2. Generally, the cogel is washed prior to mixing with the zeolite. The gellation, encompassed by step 1 and 2, may be done in a batch or continuous manner.

This amorphous silica-alumina matrix shows high MAT conversion both as prepared and after steaming. Table 3 shows the MAT results of our steamed cogel component (spray-dried) and compares its MAT results to those of a commercial octane catalyst, tradenamed Octacat, manufactured by Davison Co., division of W. R. Grace, which has been steamed at the same conditions. The amorphous cogel clearly compares favorably to the Octacat in conversion.

The Clay Component

In our invention, clay is used to weight the catalyst and to impart unique physical and chemical characteristics to the matrix. The actual physical characteristics imparted to the matrix depend on particle size and the degree of association of the clay particles. The modes of association in clay suspensions can be controlled by the use of dispersants and by pH.

For a plate-like clay particle like those present in kaolin, there are generally three different modes of particle association: face-to-face (FF), edge-to-edge (EE), and edge-to-face (EF). Since the dynamics and electrostatics for each of three modes of association is different, the three modes of association do not occur to the same extent or at the same time.

The physical results of the three types of association are quite different. For example, FF association leads to thicker and possibly larger flakes, while EE and EF association results in three-dimensional, voluminous card-house structures.

For the preparation of hydrocarbon cracking catalysts, it is necessary to use concentrated clay suspensions which are fluid enough to be poured or to be pumped; that is, the EF and/or the EE particle links must be broken. This can be done by chemical treatment which reverses the positive-edge charge and creates a well developed negative-edge double layer. This creates a strong EE and EF repulsion which results in the breakdown of the three-dimensional, cardhouse structures. Controlling the structures present in the clay suspensions is requisite for controlling their state in the final cracking catalyst. Preferred clays include talc, smectite or montmorillonite, vermiculite, mica, chlorite, kaolinites, sepiolite, and attapulgite.

In the preferred embodiment, peptizing agents or pH are used to reduce the viscosity of the clay suspensions, and thus reduce the rigid structures which are present. A preferred embodiment of the matrix preparation comprises reducing the viscosity of the amorphous silica-alumina cogel by acidification, then adding a clay suspension. The preferred clay is kaolin and/or sepiolite, whose viscosity has been reduced by increasing the pH to 8 or greater. The cogel-clay slurry is homogenized, the pH is adjusted to between 5 and 6, and then aged overnight at ambient temperature.

To determine the effect that the clay has on the physical and chemical properties of the amorphous silica-alumina after aging the slurry, its pH was adjusted and the slurry was spray-dried. Table 3 shows the effect that kaolin and sepiolite have on the surface area and pore volume of the amorphous silica-alumina cogel. FIG. 3 illustrates the shift in the pore size distribution as a function kaolin concentration.

As also shown in Table 3, substantial amounts of clay can be incorporated into the cogel before the MAT activity decreases. In addition, the activity and the selectivity of the matrix can be altered by the clay which is incorporated. For example, a magnesium-containing clay, such as sepiolite, not only increases the pore volume of the cogel, it also reduces its coke and gas production. This effect would be expected with any magnesium-containing clay which can interact with the cogel under steaming conditions.

The Inorganic Oxide Component

Inorganic oxides can be added to the catalyst to alter both the chemical and physical characteristics of the cracking catalyst. For example, the sodium or nitrogen tolerance of the octane catalyst can be increased using a separate phase alumina. The oxides or oxide precursors should be well dispersed and can be added directly to the prepared cogel, or to the sol prior to the cogellation of the amorphous silica-alumina phase during the cogel preparation. They are preferably porous, and are preferably selected from Group III, IV, V metal oxides, and mixtures thereof.

Having described the basic aspects of the present invention, the following examples are given to illustrate specific embodiments thereof. For all the examples below, the weights are given on a dry or water-free basis. Dispersants are used where necessary to improve viscosity.

EXAMPLES

Example 1

Preparation of a Cogel

Into a large tank, 18.08 lbs. of acetic acid was added to 102.49 lbs. of deionized water (DI). To this solution was added a solution of aluminum trichloride which contains 4.38 wt % aluminum and has pH of 1.1.

Into a different tank, 104.53 lbs. of a sodium silicate solution containing 28.7 wt % $SiO_2$ was mixed with 565.86 lbs. of water.

The sodium silicate solution was slowly pumped into the tank containing the aluminum trichloride solution.

The aluminum trichloride solution was stirred vigorously. The pH of the resulting slurry was about 1.9.

An NH$_4$OH solution was prepared by adding 134.81 lbs. of NH$_4$OH, which contained 28 wt % NH$_3$, to 432.8 lbs. of water. The NH$_4$OH solution was slowly pumped into the tank containing the aluminum trichloride/sodium silicate slurry while stirring the latter vigorously. This NH$_4$OH addition continued until the pH equaled 8. The ammonium hydroxide addition rate was slowed to avoid hydrogelling the contents of the vessel.

The slurry was mixed for 3 hours and the pH adjusted to maintain a pH of 8. The slurry was filtered at room temperature.

A solution of ammonium bicarbonate was prepared by dissolving 11.84 lbs. of NH4HCO$_3$ in 1,184.48 lbs. of water (DI), and the filtered gel was reslurried with the bicarbonate solution, mixed for 1 hour, and filtered at room temperature. The bicarbonating, mixing, and filtering steps above were repeated.

The washed gel was reslurried with 1,184.48 lbs. of water (DI), and filtered at room temperature. This yielded 50 lbs. of cogel on a dry basis.

Syneresis of the Cogel, Examples 1A–1I

The dried and washed cogel of Example 1 was divided into several batches, A–E. These batches were treated to determine the effects of syneresis and spray-drying on the physical and characteristics of the cogel.

Batch A:

600 mls. of deionized water (DI) was added to 4100 grams of cudgel. The mixture was homogenized, and the pH was measured at about 8.1. The mixture was then spray-dried.

Batches B,C,D:

62 grams of acetic acid was added to 8,679 grams of cogel (LOI -90 wt. %) to reduce the pH to about 5.42. Twenty-two more grams of acetic acid were added to further reduce the pH to 4.83. The mixture was homogenized, after which ammonium hydroxide was added to raise the pH to 5.59.

Batch B was aged at ambient temperature for 1 hour. The pH was 5.59.

Batch C was aged at ambient temperature 4 hrs. The pH was 5.61.

Batch D was aged at ambient temperature for 24 hours. The pH was 5.81.

Batch E:

50 grams of acetic acid was added to 4544 grams of cogel (LOI -90) to adjust the pH to 5.58. Then, another 28 grams of acetic acid were added to reduce the pH to 5.21, and finally another 19 grams were added to reduce the pH to 4.85. The mixture was constantly homogenized. The pH was then raised to 5.58 by adding ammonium hydroxide. The material was homogenized and screened, and then aged at ambient conditions for 24 hours.

These materials were spray dried to obtain an apparent bulk density (ABD) which ranged between 0.3 and 0.8 gm/cc. Higher ABD materials gave smaller pore volume and smaller average pore diameters. The physical characteristics and cracking activity for these cogels, as well as examples 1F–1H are shown in Table 10.

Batch F:

A procedure similar to Example 1 was followed except that after adding NH$_4$OH to adjust the pH to about 8, the slurry was heated to approx. 52° C. The total heating time was about 30 minutes, Thereafter the slurry was filtered. The filter cake was washed with ammonium bicarbonate and water as per Example 1. The syneresis step was accomplished by adding acetic acid to reduce the Ph to 4.96. NH$_4$OH was then added to raise the pH to 5.63. The sample was then homogenized, aged over night to a pH of ~5.57, homogenized again, and spray-dried.

Batch G:

A procedure was followed as in F, except that the slurry was heated to 81° C. and the heating time was 47 min.

Batch H:

A procedure was followed as in F, except that NH$_4$OH was added to a pH of 5.6 and the slurry was heated to 80° C. for an additional 10 min.

Batch I:

Fifty (50) pounds, on a dry basis, of the cogel was acidified with acetic acid to reduce the pH to about 5.6. The resultant slurry was homogenized with a high shear mixer and/or a colloid mill, and the acidified cogel was aged at room temperature for 16 to 36 hours.

Prior to spray-drying, the aged cogel was rehomogenized Additives can be used to reduce the viscosity to aid in spray-drying if necessary.

The cogel was spray-dried to produce a microspherical catalyst containing 60% by weight SiO$_2$ and 40% by weight Al$_2$O$_3$.

Example 2

Preparation of a Second Cogel Matrix of the Invention

Forty (40) pounds of acidified cogel was prepared using the procedure in Example II.

Ten (10) pounds of Georgia kaolin was slurried in 15–20 of water (DI) and enough tetrasodiumpyrophosphate added to reduce the viscosity to about 1.5 wt % of the clay on a dry basis. Sufficient NH$_4$OH was added to reduce the pH of the kaolin slurry to about 9.

The kaolin slurry was slowly added to the acidified cogel with stirring, and the mixture was homogenized.

The mixture was spray-dried to produce a microspherical catalyst containing 80% by weight cogel with an SiO$_2$ to Al$_2$O$_3$ weight ratio equal to 60 to 40 and 20% by weight Georgia kaolin.

Example 3

Preparation of a Third Cogel Matrix of the Invention

Sixty-nine (69) pounds of non-acidified cogel as described in Example II was prepared. Sixty-nine (69) pounds of cogel was mixed with 65 lbs. of water (DI) and homogenized.

Thirty-one (31) pounds of Spanish sepiolite was added to the cogel with mixing. Sufficient acetic acid was added to reduce the pH to 5.6 and the slurry was homogenized with a high shear mixer. The mixture was then aged for 16 to 36 hours.

Prior to spray-drying, the aged cogel was rehomogenized. Again, additives can be used to reduce the viscosity to aid in spray-drying, if necessary.

The slurry was spray-dried to produce a microspherical catalyst containing 69% by weight cogel ($SiO_2$ to $Al_2O_3$ weight ratio equal to 60 to 40) and 31% by weight Spanish sepiolite.

Example 4

Preparation of a Fourth Cogel Matrix of the Invention

Fifty-three (53) pounds of non-acidified cogel as described in Example II was prepared. The cogel was mixed with 60 lbs. of water (DI) and 23 lbs. of Spanish sepiolite was also dispersed in water (DI).

Twenty-four (24) pounds of Georgia kaolin was dispersed in water (DI). The sepiolite and the kaolin were added to the cogel and homogenized.

The pH of this combined slurry was adjusted to 5.6 by adding acetic acid, and the mixture was aged for 16 to 36 hours at ambient temperature.

Prior to spray-drying, the aged slurry was rehomogenized, and tetrasodiumpyrophosphate (TSPP) dissolved in water was added in an appropriate amount to reduce the viscosity.

The mixture was spray dried to produce a microspherical catalyst containing 53% by weight cogel ($SiO_2$ to $Al_2O_3$ weight ratio equals 60 to 40), 23% by weight Spanish sepiolite and 24% by weight Georgia kaolin.

Example 5

Preparation of a Catalyst of the Invention

Fifty (50) pounds of acidified cogel was prepared as in Example 1I.

Twenty-five (25) pounds (on a dry basis) of Union Carbide's LZ-Y82 (unit cell constant equals 24.52 Å) zeolite catalyst was dispersed in 40 lbs. of water (DI) in a high shear mixer and/or a colloid mill.

The dispersed zeolite was added to the acidified cogel, and the mixture was rehomogenized, maintaining the temperature below 35° C.

0.41 Pounds of TSPP was dissolved in 30 lbs. of water. Twenty-five (25) pounds (on a dry basis) of Georgia kaolin was dispersed in this solution with a high shear mixer (and/or colloid mill), and enough $NH_4OH$ was added to reduce the pH to 9 or less. The mixture was homogenized.

The dispersed kaolin slurry was pumped slowly into the tank containing the slurry of acidified cogel and LZ-Y82 with stirring. The resulting slurry was homogenized and then the pH was adjusted to 5.6 with acetic acid. The temperature of the slurry was maintained equal to or less than 35° C. The mixture was aged at room temperature for 16 to 36 hours.

Prior to spray-drying, the aged slurry was rehomogenized with a high shear mixer and/or a colloid mill. If necessary to aid in the spray drying, about 1 to 1.5 wt % (on a dry basis) of TSPP dissolved in water may be added. The mixture was spray-dried, as above, to produce a microspherical catalyst.

Example 6

Preparation of a Second Catalyst of the Invention

Fifty (50) pounds of acidified cogel as described in Example 1I was prepared.

Twenty-five (25) pounds (on a dry basis) of LZ-Y20 zeolite (unit cell constant equals 24.38 Å) was dispersed in 40 lbs. of water (DI) with a high shear mixer and/or colloid mill.

The dispersed zeolite was added to the acidified cogel, and the mixture was rehomogenized, keeping the temperature below 35° C.

0.41 Pounds of TSPP was dissolved in 30 lbs. of water (DI). Twenty-five (25) pounds (on a dry basis) of Georgia kaolin was dispersed in this solution with a high shear mixer (and/or colloid mill), and enough NH OH was added to reduce the pH to 9 or less. The mixture was homogenized.

The dispersed kaolin slurry was pumped slowly into the tank containing the slurry of acidified cogel and LZ-Y20 with stirring.

The resulting slurry was homogenized and then the pH was adjusted to 5.6 with acetic acid. The temperature of the slurry was maintained equal to or less than 35° C. The mixture was aged at room temperature for 16 to 36 hours.

Prior to spray-drying, the aged slurry was rehomogenized with a high shear mixer and/or a colloid mill. If necessary to aid in the spray-drying, about 1 to 1.5 wt % (on a dry basis) of TSPP dissolved in water may be added. The mixture was spray-dried, as above, to produce a microspherical catalyst.

Example 7

Preparation of a Third Catalyst of the Invention

Fifty (50) pounds of acidified cogel as described in Example II was prepared. Thirty-five (35) pounds of LZ-Y20 zeolite (unit cell constant equals 24.38 Å) was dispersed in 55 lbs. of water (DI) with a high shear mixer and/or colloid mill.

The dispersed zeolite was added to the acidified cogel, and the mixture was rehomogenized, keeping the temperature below 35° C.

0.41 Pounds of TSPP was dissolved in 30 lbs. of water (DI). Twenty-five (25) pounds (on a dry basis) of Georgia kaolin was dispersed in this solution with a high shear mixer (and/or colloid mill), and enough $NH_4OH$ was added to reduce the pH to 9 or less. The mixture was homogenized.

The dispersed kaolin slurry was pumped slowly into the tank containing the slurry of acidified cogel and LZ-Y20 with stirring. The resulting slurry was homogenized and then the pH was adjusted to 5.6 with acetic acid. The temperature of the slurry was maintained equal to or less than 35° C. The mixture was aged at room temperature for 16 to 36 hours.

Prior to spray-drying, the aged slurry was rehomogenized with a high shear mixer and/or a colloid mill. If necessary to aid in the spray-drying, about 1.0 to 1.5 weight percent (on a dry basis) of TSPP dissolved in water may be added The mixture was spray dried, as above, to produce a microspherical catalyst.

Example 8

Preparation of a Fourth Catalyst of the Invention

Fifty (50) pounds of acidified cogel as prepared in Example II was prepared.

16.67 Pounds of LZ-Y82 zeolite (unit cell constant equals 24.54 Å) was dispersed in 30 lbs. of water with a high shear mixer and/or colloid mill.

The dispersed zeolite was added to the acidified cogel and rehomogenized. The pH was adjusted to 5.6 and the slurry was allowed to age at ambient temperature for 16 to 36 hours.

Prior to spray-drying, the slurry was rehomogenized, and then spray-dried to produce a microspherical catalyst.

Example 9

Preparation of a Fifth Catalyst of the Invention

Fifty (50) pounds of acidified cogel as prepared in Example 1I was prepared.

16.67 Pounds of LZ-Y82 zeolite (unit cell constant equals 24.52 Å) was dispersed in 30 lbs of water with a high shear mixer and/or colloid mill. The dispersed zeolite was added to the acidified cogel and rehomogenized.

The pH was adjusted to 5.6 and the slurry was allowed to age at ambient temperature for 16 to 36 hours.

Prior to spray-drying, the slurry was rehomogenized, and then spray-dried to produce a microspherical catalyst.

Example 10

Preparation of a Sixth Catalyst of the Invention

Forty-four (44) pounds of acidified cogel as described in Example 1I was prepared.

Twenty-seven (27) pounds of LZ-Y82 zeolite (unit cell constant equals 24.52 Å) was dispersed in 44 lbs. of water (DI) with a high shear mixer and/or colloid mill.

Twenty-nine (29) pounds of Spanish sepiolite was dispersed in 60 lbs. of water, using TSPP to reduce the viscosity.

The zeolite slurry was then pumped into the acidified, homogenized cogel with stirring.

The sepiolite mixture was added to the cogel/zeolite slurry, the pH was adjusted to 5.6, and the slurry homogenized. The mixture was aged 16 to 36 hours at ambient temperature. The slurry was rehomogenized and spray-dried to produce a microspherical catalyst.

Example 11

Preparation of a Seventh Catalyst of the Invention

The preparation as described in Example 10 was repeated, using 27 lbs. of LZ-Y82 zeolite (unit cell constant equals 24.52 Å).

Example 12

Preparation of an Eighth Catalyst of the Invention

The preparation described in Example 10 was repeated, using 30 lbs. of LZ-Y82, 20 lbs. of the Spanish Sepiolite, and 50 lbs. of cogel.

Example 13

Preparation of a Ninth Catalyst of the Invention

The preparation described in Example 10 was repeated, using 25 lbs. of Union Carbide's LZ-Y82, 20 lbs. of the Spanish Sepiolite, and 55 lbs. of cogel.

Example 14

Preparation of a Tenth Catalyst of the Invention

Prior to preparing the catalyst, LZ-Y20 zeolite was exchanged with excess $LaCl_3 \cdot 6H_2O$ for four hours at 85° C. The filtered zeolite was washed three times with water at room temperature and once with water at 30° C. The filtered material was dried for 12 hours at 50° C. in vacuum. It was then calcined in air for one hour at 400° C. and then for two hours at 593° C.

The catalyst was prepared as described in Example 6, except 25 lbs. of the rare earth-exchanged LZ-Y20 was used.

Example 15

Preparation of an Eleventh Catalyst of the Invention

The preparation described in Example 7 was repeated.

The catalyst was exchanged with excess $LaCl_3 \cdot 6H_2O$ at 85° C. for four hours. It was then washed with water, three times, and filtered. It was washed once with warm water, 30° C., and filtered. The filtered catalyst was dried for 12 hours at 50° C. in vacuum. It was then calcined for one hour in air at 400° C., then two hours at 593° C.

Example 16

A cogel of the present invention was prepared in a continuous manner. The reagents were used in the same ratio as those in Example 1. Water, acetic acid and aluminum chloride were pre-mixed and reacted with an aqueous solution of sodium silicate in continuous mixer to form a sol. The resulting sol was then continuously reacted with ammonium hydroxide was adjusted so that the pH was 8 at the mixing point. The resulting mixture was heated for 0.5 hour, at which time the temperature of the cogel had reached 160° F.

The hot cogel can be divided into two portions. One portion was filtered and washed with ammonium bicarbonate to remove sodium and other ions. Table 10 shows the physical characteristics and cracking results for this cogel, as described in Examples 1A–1I. In Table 11, the results as formulated with LZ-Y82 and kaolin clay to prepare a cracking catalyst are compared side by side with Octacat D.

The other portion was filtered and washed with ammonium acetate at 160° F., also to remove sodium and other ions. Both methods gave satisfactory cogels.

Alternatively, this washing step can be done on spray-dried cogel prior to mixing with the zeolite.

The following tables illustrate the benefits of the invention as prepared by the previous examples and compare various formulations to comparable commercially available octane improvement catalysts.

Table 4 illustrates the benefits of aging the zeolite, clay and cogel slurry at pH 5.6 for a period of time sufficient to induce syneresis.

Tables 5 and 6 summarize the MAT results, on two different feeds, of several of our catalyst formulations and compares them to the results obtained with two commercial octane catalysts. The present formulations are all better than Octacat and several are equivalent to Octacat D. For residuum operations which are plagued by poisoning and deactivation of the catalyst with heavy metals, especially Ni and V respectively, Table 7 clearly shows the advantages of our invention in the presence of 4400 ppm V over Octacat and Octacat D.

In Table 8, the results from an evaluation done with a unit having a fixed fluidized catalyst bed and having regeneration capabilities are summarized. Once again, the advantages of the present invention are demonstrated. At the same conversion, this invention produces more high octane gasoline than three other commercial catalysts, two of which are octane catalysts. In addition, our invention makes more light cycle oil and of better quality, and it makes less heavy cycle oil.

Table 9 summarizes the results of a pilot plant with the capabilities to circulate the catalyst through a reaction, a stripping, and a regeneration zone. These results show that the catalyst also effectively produces high octane gasoline.

TABLE 1

Comparative Physical and Chemical Properties of a Typical Catalyst of the Present Invention

| Catalyst | Example 5 |
|---|---|
| $SiO_2Al_2O_3$ wt ratio | 1.5 |
| Zeolite Type | LZ-Y82 |
| Zeolite Lattice Constant, Å | 24.52 |
| Surface Area, $m^2/gm$ | 330 |
| Pore Volume, cc/gm | 0.59 |

| Pore Size Distribution | Pore Volume, % | Pore Volume, cc/gm |
|---|---|---|
| Pore Diameter Range | | |
| 25–40 | 7.2 | 0.0423 |
| 40–100 | 52.4 | 0.3084 |
| 100–500 | 35.9 | 0.2112 |
| 500–1000 | 4.1 | 0.0241 |
| After Steaming[1] | | |
| Zeolite Lattice Constant, Å | 24.28 | |
| Surface Area, $m^2/gm$ | 194 | |
| Pore Volume, cc/gm | 0.52 | |

| Pore Size Distribution | Pore Volume, % | Pore Volume, cc/gm |
|---|---|---|
| Pore Diameter Range | | |
| 25–40 | 0.7 | 0.0036 |
| 40–100 | 13.5 | 0.0696 |
| 100–500 | 79.0 | 0.4080 |
| 500–1000 | 6.9 | 0.0358 |

[1]The catalyst was steamed for five hours at 788° C. (1450° F.) in 100% steam.

TABLE 2

Effect of Rare Earth Exchange on the MAT Conversion of SSY

| Feed Properties | |
|---|---|
| Feed | A |
| Aniline Point, °F. | 181.5 |
| API Gravity | 23.5 |
| Nitrogen, ppm | 1600 |
| Ramsbottom Carbon, wt % | 0.1 |

| Zeolite Properties | | |
|---|---|---|
| Zeolite Type | LZ-Y20 | REX (LZ-Y20) |
| Zeolite Lattice Constant, Å | 24.38 | 24.38 |
| wt % $La_2O_3$ | 0 | 2.2 |

| MAT Data[1] | | |
|---|---|---|
| Temperature | 516° C. | 516° C. |
| WHSV | 15 | 15 |
| C/O | 3 | 3 |
| Conversion, wt %[2] | 36 | 48 |
| $C_4-$ | 6.6 | 9.7 |
| $C_5-430$ | 28 | 36 |
| 430–650 | 23 | 23 |
| 650+ | 42 | 29 |
| Coke | 1.3 | 1.6 |

[1]The catalysts consist of 20 wt % zeolite and 80 wt % of an inert diluent.
[2]The zeolite was steamed.

TABLE 3

Physical and Chemical Properties of Matrix Materials

| Matrix | 1 | 2 | 3 | 4 | 5 | 6 | 7 | Octacat |
|---|---|---|---|---|---|---|---|---|
| Composition | | | | | | | | |
| Cogel, wt % | 100 | 90 | 80 | 50 | 40 | 69 | 53 | |
| $SiO_2/Al_2O_3$ wt ratio | 1.5 | 1.5 | 1.5 | 1.5 | 1.5 | 1.5 | 1.5 | |
| Clay | | | | | | | | |
| Type A | — | Kaolin[1] | Kaolin | Kaolin | Kaolin | — | Kaolin | |
| wt % | — | 10 | 20 | 50 | 60 | — | 24 | |
| Type B | — | — | — | — | — | Sepiolite[2] | Sepiolite | |
| wt % | — | — | — | — | — | 31 | 23 | |
| Surface Area, $m^2/gm$ | 308 | 386 | 259 | 179 | 144 | 287 | 120 | |
| Pore Volume, cc/gm | 0.44 | — | 0.50 | 0.56 | 0.54 | 0.84 | — | |
| MAT Data[3] | | | | | | | | |
| Feed | A | | | | | | | |
| WHSV | 15 | | | | | | | |
| C/O | 3 | | | | | | | |
| Temperature, °C. | 496 | | | | | | | |
| Conversion, wt % | 48 | 46 | 42 | 41 | 35 | 43 | 42 | 51 |
| $C_4-$ | 8.9 | 7.6 | 6.9 | 5.8 | 4.1 | 7 | 7 | 9 |
| $C_5-430$ | 35 | 35 | 32 | 32 | 29 | 33 | 32 | 40 |
| 430–650 | 27 | 28 | 26 | 26 | 27 | 27 | 26 | 23 |
| 650+ | 25 | 26 | 33 | 33 | 38 | 29 | 32 | 26 |
| Coke | 3.6 | 3.4 | 3.1 | 2.8 | 2.3 | 2.7 | 2.7 | 2.2 |

[1]Georgia Kaolin.
[2]Spanish Sepiolite.
[3]The spray dried catalyst materials were steamed for five hours at 788° C. (1450° F.) in 100% steam. Octacat, sold by Davison Chemical Division, W. R. Grace and Co., was steamed at the same conditions.

TABLE 4

Effect of Aging on Catalyst Performance

| Catalyst | Typical of Example 7 | |
|---|---|---|
| Aged, Hr. | 0.5 | 24 |
| Zeolite | LZ-Y20 | LZ-Y20 |
| Wt % | 35 | 35 |
| Unit Cell, Å | 24.37 | 24.37 |
| Matrix | | |
| Wt % Cogel | 50 | 50 |
| Wt % Kaolin | 15 | 15 |
| MAT Data[1] | | |
| Feed | A | A |
| T° C., °F. | 496 (925) | 496 (925) |
| C/O | 3 | 3 |
| WHSV | 15 | 15 |
| Conversion, Wt % | 59.8/62.5 | 66.4/67.2 |
| Coke | 2.88/2.96 | 3.82/3.94 |
| $C_5-430$ | 43.8/45.3 | 47.1/47.7 |
| 430–650 | 23.8/24.2 | 22.4/22.9 |
| 650+ | 16.5/13.3 | 11.2/10.0 |
| $C_2-$ | 1.4/1.6 | 1.7/1.7 |
| $C_4-$ | 13.2/14.2 | 15.5/15.5 |
| $C_4E/C_4T$ | 0.58/0.59 | 0.53/0.53 |

TABLE 4-continued

Effect of Aging on Catalyst Performance

| Recovery, Wt % | 99.7/99.2 | 98.9/98.4 |
|---|---|---|

(1) The spray-dried catalysts were steamed for five hours in 100% steam at 788° C. (1450° F.).

TABLE 5

Catalyst Performance

| Example | 1 | 2 | 3 | 4 | 5 | 6 | 7 |
|---|---|---|---|---|---|---|---|
| Composition | | | | | | | |
| Zeolite | — | — | — | — | LZ-Y82 | LZ-Y20 | LZ-Y20 |
| Lattice Constant, Å | — | — | — | — | 24.52 | 24.38 | 24.38 |
| Matrix | | | | | | | |
| Cogel, wt % | 100 | 80 | 69 | 53 | 50 | 50 | 50 |
| Clay | | | | | | | |
| Type A | — | Kaolin(3) | — | Kaolin | Kaolin | Kaolin | Kaolin |
| wt % | — | 20 | — | 24 | 25 | 25 | 15 |
| Type B | — | — | Sepiolite(4) | Sepiolite | — | — | — |
| wt % | — | — | 31 | 23 | — | — | — |
| MAT Data(2) | | | | | | | |
| Feed | A | | | | | | |
| WHSV | 15 | | | | | | |
| C/O | 3 | | | | | | |
| Temperature, °C. | 496 | | | | | | |
| Conversion, wt % | 48 | 42 | 43 | 42 | 62 | 62 | 67 |
| C4— | 9 | 7 | 7 | 7 | 12 | 15 | 16 |
| C5–430 | 35 | 32 | 33 | 32 | 46 | 45 | 47 |
| 430–650 | 27 | 26 | 27 | 26 | 23 | 23 | 23 |
| 650+ | 25 | 33 | 29 | 32 | 14 | 13 | 11 |
| Coke | 3.6 | 2.8 | 2.7 | 2.7 | 4.0 | 3.5 | 3.9 |
| C4E/C4T | 0.66 | 0.63 | 0.69 | 0.69 | 0.50 | 0.46 | 0.53 |

| Example | 8 | 9 | 10 | 11 | 12 | 13 | Octacat(1) | Octacat D(1) |
|---|---|---|---|---|---|---|---|---|
| Composition | | | | | | | | |
| Zeolite | LZ-Y82 | LZ-Y82 | LZ-Y82 | LZ-Y20 | LZ-Y20 | LZ-Y82 | USY | USY |
| Lattice Constant, Å | 24.54 | 24.52 | 24.54 | 24.52 | 24.52 | 24.54 | | |
| Matrix | | | | | | | | |
| Cogel, wt % | 75 | 75 | 44 | 44 | 50 | 55 | | |
| Clay | | | | | | | | |
| Type A | — | — | — | — | — | — | | |
| wt % | — | — | — | — | — | — | | |
| Type B | — | — | Sepiolite | Sepiolite | Sepiolite | Sepiolite | | |
| wt % | — | — | 29 | 29 | 20 | 20 | | |
| MAT Data(2) | | | | | | | | |
| Feed | A | | | | | | | |
| WHSV | 15 | | | | | | | |
| C/O | 3 | | | | | | | |
| Temperature, °C. | 496 | | | | | | | |
| Conversion, wt % | 62 | 63 | 62 | 60 | 61 | 61 | 51 | 63 |
| C4— | 12 | 12 | 11 | 12 | 11 | 11 | 9 | 11 |
| C5— | 46 | 48 | 48 | 45 | 47 | 47 | 40 | 48 |
| 430–650 | 25 | 23 | 24 | 24 | 24 | 24 | 23 | 23 |
| 650+ | 13 | 14 | 14 | 17 | 15 | 15 | 26 | 14 |
| Coke | 4.3 | 3.5 | 3.0 | 3.5 | 3.5 | 3.1 | 2.2 | 3.8 |
| C4E/C4T | 0.52 | 0.48 | 0.49 | 0.55 | 0.48 | 0.50 | 0.50 | 0.49 |

(1) Octane catalysts sold by Davison Chemcal Division, W. R. Grace and Co.
(2) The spraydried catalysts, matrices, and commercial catalysts.
(3) Georgia Kaolin.
(4) Spanish Sepiolite.

TABLE 6

Comparative Catalyst Performance

| Example | 7 | 14 | 15 | Octacat D |
|---|---|---|---|---|
| Composition | | | | |
| Zeolite | LZ-Y20 | LZ-Y20 | LZ-Y20 | USY |
| Lattice Constant, Å | 24.38 | 24.38 | 24.38 | |
| Matrix | | | | |
| Cogel, wt % | 50 | 50 | | |
| Clay | | | | |
| Type A | Kaolin | Kaolin | Kaolin | |
| wt % | 15 | 25 | 15 | |
| wt % La2O3 | 0 | 0.72 | f6 | |
| MAT Data | | | | |
| Feed | C | | | |
| WHSV | 15 | | | |
| C/O | 3 | | | |
| Temperature, °C. | 516 | | | |
| Conversion, wt %(1) | 73 | 76 | 74 | 70 |
| C4— | 19 | 21 | 19 | 18 |
| C5–430 | 50 | 52 | 52 | 48 |
| 430–650 | 15 | 15 | 16 | 18 |
| 650+ | 12 | 9 | 9 | 13 |
| Coke | 4.1 | 3.9 | 3.9 | 4.5 |
| C4E/C4T | 0.53 | 0.47 | 0.54 | 0.50 |

(1) Octane catalysts sold by Davison Chemical Division, W. R. Grace and Co.

TABLE 7

| | Comparative Catalyst Performance | | | | | |
|---|---|---|---|---|---|---|
| Example | 9 | 11 | 13 | Octacat[1] | Octacat D[1] | GRZ1[3] |
| MAT Data[2] | | | | | | |
| Feed | A | | | | | |
| WHSV | 15 | | | | | |
| C/O | 3 | | | | | |
| Temperature, °C. | 496 | | | | | |
| Conversion, wt % | 51 | 53 | 54 | 24 | 38 | 58 |
| $C_4-$ | 8 | 8 | 9 | 3 | 5 | 12 |
| $C_5$–430 | 35 | 40 | 40 | 19 | 30 | 41 |
| 430–650 | 26 | 26 | 26 | 23 | 26 | 19 |
| 650+ | 23 | 21 | 21 | 53 | 36 | 24 |
| Coke | 7.3 | 4.9 | 4.2 | 2.3 | 3.2 | 5.1 |
| $C_4E/C_4T$ | 0.65 | 0.63 | 0.61 | 0.68 | 0.71 | 0.26 |
| Metals on Catalyst | | | | | | |
| Vanadium, ppm | ←——4400——→ | | | | | |

[1] Octane catalysts sold by Davison Chemical Division, W. R. Grace and Co.
[2] The catalysts were loaded with vanadium from a vanadium naphthenate/toluene solution, heated in $N_2$ stepwise to 593° C., then calcined at 593° C. in air for four hours. The calcined and commercial catalysts were steamed for five hours at 788° C. in 100% steam.
[3] A metals-tolerant catalyst sold by Davison Chemical Division, W. R. Grace and Co.

TABLE 8

| | Performance of Catalysts of our Invention | | | |
|---|---|---|---|---|
| Regeneration Temperature, °F. | 30 seconds | Octacat D | Octacat | Super D Type |
| Example | 5 | Octacat D | Octacat | Super D Type |
| Feed | B | | | |
| API | 23.8 | | | |
| Aniline Point, °F. | 198 | | | |
| Concarbon, wt % | 0.40 | | | |
| Nitrogen, wt % | 0.078 | | | |
| Fluid Bed Pilot Unit | | | | |
| Reaction, Temperature, °F. | 950 | | | |
| Regeneration Temperature, °F. | 1250 | | | |
| CO | 4.0 | 4.0 | 4.4 | 3.0, 4.4 |
| Contact Time | 30 seconds | | | |
| Conversion, vol % | 65 | 65 | 65 | 65 |
| $C_2^-$, wt % | 1.2 | 1.2 | 1.2 | 1.5 |
| $C_3$, vol % | 6.5 | 6.8 | 6.8 | 7.5 |
| $C_4$, vol % | 10.1 | 11.1 | 11.1 | 10.8 |
| $C_4$, vol % | 5.5 | 5.5 | 5.5 | 4.2 |
| $iC_4$, vol % | 4.0 | 4.8 | 4.8 | 5.3 |
| $C_5+$ Gasoline, V % | 56.7 | 55.7 | 55.7 | 54.6 |
| RON | 91.5 | 91.5 | 91.5 | 88.5 |
| MON | 81.5 | 81.3 | 81.3 | 81.3 |
| Aniline Pt, °F. | 84 | 80 | 80 | 87 |
| Bromine number | 72 | 72 | 72 | 39 |
| LCO, V % | 16.6 | 16.0 | 15.4 | 13.2 |
| API Gravity | 23.1 | 22.1 | 22.1 | 19.90 |
| Aniline Pt, °F. | 70 | 64 | 64 | 51 |
| HCO, V % | 18.4 | 19.0 | 19.6 | 21.8 |
| API Gravity | 13.5 | 13.5 | 13.5 | 13.5 |
| Aniline Pt, °F. | 163 | 163 | 163 | 163 |

TABLE 9

| Performance of Catalyst of Example 6 | | |
|---|---|---|
| Example | 6 | |
| Feed Properties | | |
| Feed | C | |
| Aniline Point, °F. | 198.3 | |
| API, Gravity | 26.1 | |
| Nitrogen, ppm | 920 | |
| Ramsbottom Carbon, wt % | 0.1 | |
| Pilot Plant Yields[1][2] | | |
| Reactor Outlet Temperature, °F. | 940 | 980 |
| C/O | 8.8 | 8.8 |
| Catalyst Temperature in Regenerator, °F. | 1150 | 1220 |
| Conversion, wt % | | |
| 430° F.− | 67 | 73 |
| 650° F.− | 84 | 88 |
| $C_4-$ | 18 | 23 |
| $C_5$–430° F. | 45 | 46 |
| Light Gasoline st–265° F. | | |
| RON | 93.3 | 94.2 |
| MON | 79.1 | 79.8 |
| Heavy Gasoline 265–430 | | |
| RON | 89.3 | 93.0 |
| MON | 79.8 | 82.2 |
| LCO | 16 | 15 |
| HCO | 17 | 12 |
| Coke | 4.1 | 4.0 |
| $C_4E/C_4T$ | 0.62 | 0.68 |

[1] Catalyst was steamed at 788° C. (1450° F.) for five hours in 100% steam.
[2] The pilot plant circulates the catalyst through a riser, a stripper, and a regenerator.

TABLE 10

| | A | B | C | D | E | F | G | H |
|---|---|---|---|---|---|---|---|---|
| Sfc. Area | 317 | 311 | 312 | 326 | 355 | 342 | 322 | 371 |
| PSD | 149 | 37 | 37 | 35 | 133 | 59 | 79 | 179 |
| PV | 0.79 | 0.40 | 0.41 | 0.29 | 0.64 | 0.54 | 0.67 | 0.94 |

TABLE 10-continued

|  | A | B | C | D | E | F | G | H |
|---|---|---|---|---|---|---|---|---|
| wt % Al2O3 | 2 | <5 | nd | nd | 2 | 17 | 19 | 2 |
| MAT |  |  |  |  |  |  |  |  |
| Conversion, wt. % | 73 | 75 | 73 | 77 | 75 | 70 | 70 | 74 |
| C5–430 | 39 | 40 | 40 | 41 | 40 | 39 | 39 | 41 |
| Coke | 14 | 12 | 12 | 13 | 13 | 10 | 9 | 11 |
| C4E/C4T | 0.50 | 0.42 | 0.42 | 0.37 | 0.44 | 0.50 | 0.53 | 0.49 |

MAT of calcined spray dried cogel on Feed A
*nd = not determined

TABLE 11

|  | Ex. 16 | Octacat D |
|---|---|---|
| MAT Test on Feed A |  |  |
| Conversion | 65 | 63 |
| Gasoline | 46 | 46 |
| Coke | 2.9 | 2.6 |
| Attrition | 4 |  |
| Surface Area (Fresh), m²/g | 294 |  |
| STMD | 182 |  |
| Apparent Bulk Density | 0.53 |  |

As can be seen from this data, the catalyst have better conversions and higher or equivalent gasoline yields than commercial Octacat D.

What is claimed is:

1. A process for catalytically cracking hydrocarbonaceous feedstock, wherein said cracking catalyst consists essentially of a composition for increasing the octane and yield of gasoline produced from a fluid catalytic cracking process, said composition consisting essentially of:
   a. large pore zeolite;
   b. natural or synthetic clay; and
   c. an amorphous silica-alumina matrix, wherein said matrix is prepared by mixing a silica sol and an aluminum salt while maintaining the pH of said mixture below about 4, and precipitating a cogel from said mixture by adjusting the pH; and wherein said composition is prepared by steps consisting essentially of:
   (i) combining said zeolite, clay, and cogel, provided that the pH of said cogel or said combination containing said cogel is adjusted to between about 4 and 7, and conditions are controlled to induce syneresis and viscosity reduction to provide a cogel having meso and macro pore sizes and a $N_2$ pore size distribution peak diameter ranging from about 30 Å to 260 Å, and further provided that when said zeolite is introduced into said combination the pH is between about 3 and 7; and
   (ii) forming said combination into particles.

2. A process according to claim 1 wherein said cogelled, silica-alumina matrix is prepared by the method which comprises;
   a. mixing a silicate solution with an aqueous solution of an acid aluminum salt and an acid, to form an acidified silica sol in said aluminum salt solution, and adjusting said silica sol/aluminum salt solution mixture to a pH in the range of about 1 to 4;
   b. slowly adding sufficient base with vigorous stirring, to said acidified silica sol/aluminum salt solution mixture to form a cogel slurry of silica and alumina, and to adjust said slurry to a pH in the range of about 5 to 9;
   c. aging said cogel slurry for up to about 3 hours at ambient to 95° C.;
   d. adjusting the pH of said cogel slurry to about 5 to 9;
   e. recovering a cogelled mass from said slurry; and
   f. washing said cogelled mass.

3. The process as claimed in claim 1 or 2 wherein said hydrocarbonaceous feed comprises residuum or incremental residuum.

4. The process as claimed in claim 3 wherein said residuum contains catalyst-contaminating metals.

* * * * *